(12) United States Patent
Gutacker et al.

(10) Patent No.: US 12,247,106 B2
(45) Date of Patent: Mar. 11, 2025

(54) ONIUM-FUNCTIONALIZED SILOXANES

(71) Applicant: Henkel AG & Co. KGaA, Duesseldorf (DE)

(72) Inventors: Andrea Gutacker, Langenfeld (DE); Christian Kastner, Duesseldorf (DE); Johann Klein, Duesseldorf (DE); Annika Dietrich, Rostock (DE); Esteban Mejia, Rostock (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 17/537,631

(22) Filed: Nov. 30, 2021

(65) Prior Publication Data

US 2022/0089820 A1    Mar. 24, 2022

Related U.S. Application Data

(63) Continuation of application No. PCT/EP2020/064245, filed on May 22, 2020.

(30) Foreign Application Priority Data

May 31, 2019  (EP) .................................... 19177583

(51) Int. Cl.
| | | |
|---|---|---|
| C08G 77/26 | (2006.01) | |
| A01N 55/00 | (2006.01) | |
| C08G 77/24 | (2006.01) | |
| C08G 77/28 | (2006.01) | |
| C08G 77/30 | (2006.01) | |
| C08G 77/388 | (2006.01) | |
| C08G 77/392 | (2006.01) | |
| C08G 77/395 | (2006.01) | |

(52) U.S. Cl.
CPC ............. *C08G 77/26* (2013.01); *A01N 55/00* (2013.01); *C08G 77/24* (2013.01); *C08G 77/28* (2013.01); *C08G 77/30* (2013.01); *C08G 77/388* (2013.01); *C08G 77/392* (2013.01); *C08G 77/395* (2013.01)

(58) Field of Classification Search
CPC ....................................................... C09D 5/14
See application file for complete search history.

(56) References Cited

U.S. PATENT DOCUMENTS

| | | | |
|---|---|---|---|
| 2,823,218 A | | 2/1958 | Speier et al. |
| 3,677,347 A | * | 7/1972 | Rosen .................. A62D 1/0071 |
| | | | 169/44 |
| 3,715,334 A | | 2/1973 | Karstedt |
| 3,814,730 A | | 6/1974 | Karstedt |
| 3,923,705 A | | 12/1975 | Smith |
| 5,747,622 A | | 5/1998 | Maeda et al. |
| 7,402,413 B2 | | 7/2008 | Matsuda et al. |
| 2018/0280201 A1 | | 10/2018 | Grossman et al. |

FOREIGN PATENT DOCUMENTS

| | | |
|---|---|---|
| CN | 105295050 A | 2/2016 |
| CN | 107857862 A | 3/2018 |
| EP | 2275154 A1 | 1/2011 |
| EP | 3663329 A1 | 6/2020 |
| WO | 2007099042 A1 | 9/2007 |
| WO | 2013096211 A1 | 6/2013 |
| WO | 2018005190 A1 | 1/2018 |

OTHER PUBLICATIONS

Mizerska et al., Eur. Polym. J. 2009, 45, 779.
Mizerska et al., J. Inorg. Organomet. Polym. Mater. 2010, 20, 554.
Sauvet et al., J. Appl. Polym. Sci. 2000, 75, 1005.
Chen et al., J. Appl. Polym. Sci. 2015, 132, 41723.

* cited by examiner

*Primary Examiner* — Marc S Zimmer
(74) *Attorney, Agent, or Firm* — Mary K. Cameron

(57) ABSTRACT

The present invention relates to an onium-functionalized siloxane having the general Formula (X) or (X-A) as defined herein; a method for preparing the onium-functionalized siloxane; and its use as an antimicrobial agent.

16 Claims, No Drawings

ONIUM-FUNCTIONALIZED SILOXANES

The present invention relates to an onium-functionalized siloxane containing a siloxane backbone having at least one onium-functionalized side group. The starting material is a monomeric, oligomeric or polymeric, linear or cyclic siloxane, in which at least one functionalized side-group, preferably halogen-functionalized or pseudohalogen-functionalized side-group, is bonded to the siloxane backbone through a silyl-heteroatom bond, preferably silyl-oxo (Si—O) bond. The onium-functionalized siloxanes according to the present invention show antimicrobial activity, for instance against fungi, yeasts and gram-positive and gram-negative bacteria. In addition, the present invention is directed to a method for preparing the onium-functionalized siloxane and the use thereof as an antimicrobial agent.

Siloxanes, more precisely silicones, with functionalized groups are already known in literature. Most papers or patents deal with branched silicones which contain only siloxane groups or functional groups connected via silyl-carbon bonds, or silicones having alkyl or acyl groups, which have no special functionality or are very unreactive.

There are only few reports of compounds containing onium groups from the $15^{th}$ or $16^{th}$ group of the periodic table, which are bonded to a silicone or siloxane backbone. Most reports including WO 2018/005190 A1 deal with curing systems, in which silicones and onium-containing compounds are mixed, but not covalently connected. The drawbacks inherent to this approach are the formation of inhomogeneous mixtures and an uncontrollable and very fast leaching or loss of the onium-functionalized compounds.

Other patents deal with copolymers, which contain siloxane units and onium-functionalized units in the same backbone or as end groups. U.S. Pat. No. 5,747,622 discloses a polymer having silicon atoms and sulfonium salt units in its main chain. The high stability of these materials precludes the possibility of controlled functional group release or leaching without destroying the whole polymer backbone. CN 107857862 A discloses dication-type silicone-modified water-based polyurethane color fixing agents, which possess sulfonium-functionalization as end groups. This limits the possibilities of usage, as well as the effect of the sulfonium groups.

Siloxanes having functional ammonium groups via sulfur bridge has been known. In such case, as the functional group is not bonded to the siloxane backbone via silyl-heteroatom bond, there is no possibility of releasing the antimicrobial functional group. Furthermore, there is also no control of the leaching effects without destroying the whole polymer backbone.

Therefore, it is an object of the present invention to provide an onium-functionalized siloxane and its preparation method which overcomes at least some of drawbacks of the known systems.

Onium-functionalized siloxanes according to the present invention contain a siloxane backbone having at least one onium-functionalized side group, which is connected to the siloxane backbone via silyl-heteroatom bond, preferably silyl-oxo bond (Si—O), which can be hydrolyzed in a controllable manner. The starting material is a monomeric, oligomeric or polymeric, linear or cyclic siloxane, in which at least one functionalized side-group, preferably halogen-functionalized side-group or pseudohalogen-functionalized side-group, is bonded to the siloxane backbone through a silyl-heteroatom bond, preferably silyl-oxo (Si—O) bond. The afore mentioned starting material can be ionized/derivatized with a nucleophile containing at least one atom selected from the 15th or 16th group of the periodic table, such as N, P, As, O, S and Se, preferably in the absence of a catalyst, to form an onium-cation.

Due to the presence of a silyl-heteroatom bond such as silyl-oxo (Si—O) bond, the onium-functionalized side-groups, which show antimicrobial activity, can be released upon hydrolysis. Furthermore, by controlling the amount of the side-groups, the solubility of the silicone in water can be controlled as well.

In accordance with the first aspect of the invention there is provided an onium-functionalized siloxane having the general formula (X) or (X-A) as defined herein.

The present invention also provides a method for preparing said onium-functionalized siloxane.

Yet another aspect, the present invention provides use of the onium-functionalized siloxane according to the invention or obtained by the method according to the invention as an antimicrobial agent, preferably against molds, yeasts, fungi, gram-positive bacteria, or gram-negative bacteria.

As used herein, the singular forms "a", "an" and "the" include plural referents unless the context clearly dictates otherwise.

The terms "comprising" and "comprises" as used herein are synonymous with "including", "includes", "containing" or "contains", and are inclusive or open-ended and do not exclude additional, non-recited members, elements or method steps.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The words "preferred" and "preferably" are used frequently herein to refer to embodiments of the disclosure that may afford particular benefits, under certain circumstances. However, the recitation of one or more preferable or preferred embodiments does not imply that other embodiments are not useful and is not intended to exclude those other embodiments from the scope of the disclosure.

As used herein, room temperature is 23° C. plus or minus 2° C.

The molecular weights given in the present text refer to number average molecular weights (Mn), unless otherwise stipulated. All molecular weight data refer to values obtained by gel permeation chromatography (GPC) carried out using HP1090 II Chromatography with DAD detector (HEWLETT PACKARD) at 40° C. Tetrahydrofuran (THF) was used as an eluent. THF was passed through three PSS SDV gel columns with molecular weight ranges of 102, 103 and 104 g·mol$^{-1}$ with a flow rate of 0.9 ml·min$^{-1}$. The calibration of the device was carried out using polystyrene standards.

As used herein, "polydispersity" refers to a measure of the distribution of molecular mass in a given polymer sample. The polydispersity is calculated by dividing the weight average molecular weight (Mw) by the number average molecular weight (Mn).

For convenience in the description of the process of this invention, unsaturation provided by $CH_2$=CH—$CH_2$— terminal group is referred to as "allyl" unsaturation.

As used herein, "$C_1$-$C_8$ alkyl" group refers to a monovalent group that contains 1 to 8 carbons atoms, that is a radical of an alkane and includes linear and branched organic groups. Examples of alkyl groups include, but are not limited to: methyl; ethyl; propyl; isopropyl; n-butyl; isobutyl; sec-butyl; tert-butyl; n-pentyl; n-hexyl; n-heptyl; and, 2-ethylhexyl. In the present invention, such alkyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide and hydroxy. The halogenated derivatives of the exemplary hydrocarbon radicals listed above might, in particular, be mentioned as examples of suitable substituted alkyl groups. In general, however, a preference for unsubstituted alkyl groups containing from 1 to 6 carbon atoms ($C_1$-$C_6$ alkyl)—for example unsubstituted alkyl groups containing from 1 to 4 carbon atoms ($C_1$-$C_4$ alkyl)—should be noted.

As used herein, the term "$C_2$-$C_8$ alkenyl" group refers to an aliphatic hydrocarbon group which contains 2 to 8 carbon atoms and at least one carbon-carbon double bond, e.g., ethenyl, propenyl, butenyl, or pentenyl and structural isomers thereof such as 1- or 2-propenyl, 1-, 2-, or 3-butenyl, etc. Alkenyl groups can be linear or branched and substituted or unsubstituted. If they are substituted, the substituents are as defined above for alkyl.

As used herein, the term "$C_2$-$C_8$ alkynyl" group refers to an aliphatic hydrocarbon group which contains 2 to 8 carbon atoms and at least one carbon-carbon triple bond, e.g., ethynyl (acetylene), propynyl, butynyl, or pentynyl and structural isomers thereof as described above. Alkynyl groups can be linear or branched and substituted or unsubstituted.

The term "$C_3$-$C_{10}$ cycloalkyl" is understood to mean a saturated, mono-, bi- or tricyclic hydrocarbon group having from 3 to 10 carbon atoms. Examples of cycloalkyl groups include: cyclopropyl; cyclobutyl; cyclopentyl; cyclohexyl; cycloheptyl; cyclooctyl; adamantane; and, norbornane.

As used herein, an "$C_6$-$C_{18}$ aryl" group used alone or as part of a larger moiety—as in "aralkyl group"—refers to optionally substituted, monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. Exemplary aryl groups include: phenyl; indenyl; naphthalenyl; tetrahydronaphthyl, tetrahydroindenyl; tetrahydroanthracenyl; and, anthracenyl. And a preference for phenyl groups may be noted.

As used herein, an "aralkyl" group refers to an alkyl group that is substituted with an aryl group. An example of an aralkyl group is benzyl.

The terms "$C_1$-$C_{60}$ alkylene" group and "$C_1$-$C_{20}$ alkylene" group refer respectively to divalent groups that contain from 1 to 60 or from 1 to 20 carbon atoms, that are radicals of an alkane and include linear, branched or cyclic groups, which groups may be substituted or substituted and may optionally be interrupted by at least one heteroatom.

As used herein, the term "alkenylene" group refers to a divalent aliphatic hydrocarbon group having at least one carbon-carbon double bond that is a radical of an alkene. An alkenylene group can be linear or branched and substituted or unsubstituted.

As used herein, the term "alkynylene" group refers to a divalent aliphatic hydrocarbon group having at least one carbon-carbon triple bond, that is a radical of an alkyne. An alkynylene group can also have one or more carbon-carbon double bonds. An alkynylene group can be linear or branched and substituted or unsubstituted.

As used herein, the term "arylene" group refers to a divalent group that is a radical of an aryl group. Suitable arylene group includes phenylene, furanylene, piperidylene, and naphthylene.

As used herein, the term "aralkylene" group refers to a divalent group that is a radical of an aralkyl group. An aralkylene can be represented by the formula —R—Ar— where R is an alkylene and Ar is an arylene, i.e., an alkylene is bonded to an arylene. Suitable aralkylene groups includes xylylene and toluenylene.

Where mentioned, the expression "contain at least one heteroatom" means that the main chain or side chain of a residue comprises at least one atom that differs from carbon atom and hydrogen. Preferably the term "heteroatom" refers to nitrogen, oxygen, silicon, sulfur, phosphorus, halogens such as Cl, Br, F. Oxygen (O) and nitrogen (N) may be mentioned as typical heteroatoms in the context of the present invention.

As used herein, the term "hydrocarbon residue" includes saturated or unsaturated hydrocarbon residues.

As used herein, the "heterocyclic compound" refers to a saturated or unsaturated, monocyclic, bicyclic, polycyclic or fused compound containing at least one heteroatom, preferably O, S, N, and/or P, in the ring structure.

As used herein, the term "halogen" refers to fluorine, chlorine, bromine or iodine and correspondingly the term "halide" denotes fluoride, chloride, bromide or iodide anions.

The term "pseudohalogen" refers to inorganic or organic groups which, when in the form of anions exhibit chemical properties similar to those of the halide ions. Pseudohalogen groups include, although are not exclusive to, azido (N3), thiocyano (SCN) and cyano (CN).

Onium-functionalized siloxanes according to the present invention have the general Formula (X) or (X-A):

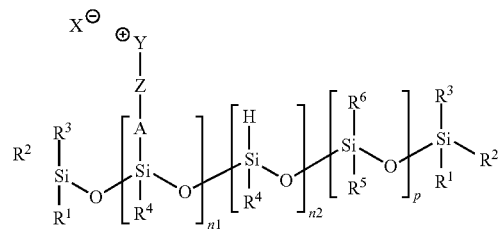

Formula (X)

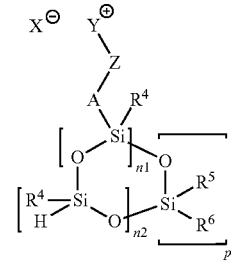

Formula (X-A)

wherein:
$R^1$, $R^2$, $R^3$, $R^4$, $R^5$ and $R^6$ may be the same or different and
  each is independently selected from a hydrogen atom or
  a linear, branched or cyclic hydrocarbon residue having
  1 to 20 carbon atoms which may contain at least one
  heteroatom;

A is a heteroatom, preferably O or S, or a heteroatom-containing group, preferably $NR^7$ or $PR^7$, where $R^7$ is selected from a hydrogen atom, a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom;

Z is selected from a linear, branched or cyclic hydrocarbon residue having 2 to 60 carbon atoms which may contain at least one heteroatom;

Y is an onium group;

X is selected from halogen atoms, pseudohalogens, or anions selected from $Tf_2N$, $BF_4$ or $PF_6$;

in Formula (X) n1 is an integer from 1 to 1000, n2 is an integer from 0 to 100, and p is an integer from 0 to 1000; and in Formula (X-A) n1 is an integer from 1 to 100, n2 is an integer from 0 to 10, and p is an integer from 0 to 100, wherein the sum p+n1+n2 is equal to or higher than 3.

In Formula (X) and Formula (X-A), the different siloxane subunits n, n1, n2, and p are not necessarily present in the order illustrated herein. The subunits n, n1, n2, and p can be randomly distributed in the siloxane backbone in every possible combination.

In Formula (X) and Formula (X-A), $R^1$, $R^2$, $R^3$, $R^4$, $R^5$ and $R^6$ may be the same or different and each is independently selected from a hydrogen atom or a linear, branched or cyclic hydrocarbon residue having 1 to 20 carbon atoms which may contain at least one heteroatom, preferably selected from O, N, S, Si, P, Cl, Br or F.

In preferred embodiments, $R^1$, $R^2$, $R^3$, $R^4$, $R^5$ and $R^6$ are the same or different and each is independently selected from the group consisting of a $C_1$-$C_{12}$ alkyl group, more preferably $C_1$-$C_8$ alkyl group, a $C_2$-$C_8$ alkenyl group, a $C_2$-$C_8$ alkynyl group, a $C_3$-$C_{10}$ cycloalkyl group, a $C_6$-$C_{18}$ aryl group and a $C_6$-$C_{18}$ aralkyl group, which may contain at least one heteroatom, preferably selected from O, N, S, Si, P, Cl, Br or F.

In more preferred embodiments, $R^1$, $R^2$, $R^3$, $R^4$, $R^5$ and $R^6$ are the same or different and each is independently selected from a $C_1$-$C_8$ alkyl group which may contain at least one heteroatom, preferably selected from O, N, S, Si, P, Cl, Br or F, in particular methyl, ethyl, n-propyl, fluoropropyl, n-butyl, sec-butyl, or tert-butyl, or a $C_6$-$C_{18}$ aryl group which may contain at least one heteroatom, preferably selected from O, N, S, Si, P, Cl, Br or F, in particular phenyl, tolyl or benzoyl. In most preferred embodiments, $R^1$, $R^2$, $R^3$, $R^4$, $R^5$ and $R^6$ are the same or different and independently selected from methyl or phenyl.

In Formula (X) and Formula (X-A), A is preferably selected from O, S, $NR^7$ or $PR^7$, where $R^7$ is selected from a hydrogen atom, a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom, preferably selected from O, N, S, P, Cl, Br or F. In more preferred embodiments, A is selected from 0 or S, in particular O, which provides a silyl-oxo bond between siloxane backbone and the onium-functionalized side-groups.

In Formula (X) and Formula (X-A), Z is selected from a linear, branched or cyclic hydrocarbon residue having 2 to 60 carbon atoms, preferably 2 to 20 carbon atoms, which may contain at least one heteroatom, preferably selected from O, N, S, P, Si, Cl, Br or F.

In preferred embodiments, Z is selected from the group consisting of a $C_2$-$C_{20}$ alkylene group, a $C_2$-$C_{20}$ alkenylene group, $C_2$-$C_{20}$ alkynylene group, a $C_6$-$C_{18}$ arylene group and a $C_6$-$C_{18}$ aralkylene group, which may contain at least one heteroatom, preferably selected from O, N, S, P, Si, Cl, Br or F.

In Formula (X) and Formula (X-A), Y is an onium group, which can be represented as $ER^cR^d$ where E is a positively charged atom selected from the 16th group of the periodic table, preferably O, S or Se, or $ER^cR^dR^e$ where E is a positively charged atom selected from the 15th group of the periodic table, preferably N, P or As, wherein $R^c$, $R^d$ and $R^e$ may be the same or different and each is independently selected from a hydrogen atom, a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom, preferably O, N, S, Si, Cl, Br or F.

In Formula (X) and Formula (X-A), X is selected from halogen atoms, preferably selected from Br, I or Cl, pseudohalogens, preferably cyano (CN), azido (N3), cyanate (OCN), isocyanate (NCO), thiocyanate (SCN), isothiocyanate (NCS), or anions selected from $Tf_2N$, $BF_4$ or $PF_6$.

In preferred embodiments, X is selected from halogen atoms, preferably from Br, I or Cl, more preferably Br or I, in particular Br.

In some embodiments, in Formula (X), the sum n1+n2 is an integer from 1 to 500, more preferably from 1 to 100; and/or p is an integer from 0 to 500, more preferably from 0 to 100. In some embodiments, the siloxane may contain diorganosiloxane units, such as dimethylsiloxane or diphenylsiloxane units, in the backbone. The ratio between n units and p units can be varied.

In some embodiments, in Formula (X-A), n or the sum n1+n2 is an integer from 1 to 50, more preferably from 1 to 30; and/or p is an integer from 0 to 50, more preferably from 0 to 30, wherein the sum p+n1+n2 is equal to or higher than 3.

In preferred embodiments, said onium-functionalized siloxane is a monomer, oligomer or polymer and has a number average molecular weight (Mn) of from 100 to 50,000 g/mol, preferably 100 to 25,000 g/mol, more preferably from 100 to 15,000 g/mol.

The present invention provides a method for preparing the onium-functionalized siloxane having the general Formula (X) or (X-A) as defined herein, comprising:

(i) providing a siloxane having the general Formula (I) or (I-A)

Formula (I)

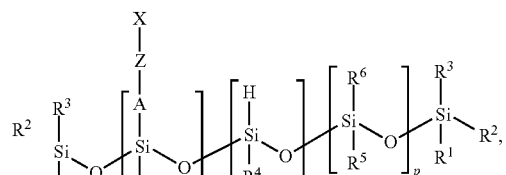

Formula (I-A)

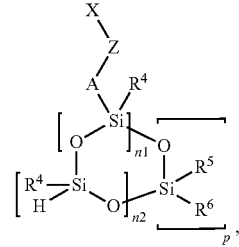

wherein R¹ to R⁶, A, Z, X, n1, n2, and p are the same as defined for the Formula (X) or (X-A) above; and (ii) nucleophilic substitution of the X on the siloxane of Formula (I) or (I-A) by a nucleophile containing at least one atom selected from the 15th or 16th group of the periodic table, preferably N, P, As, O, S or Se, preferably in the absence of a catalyst.

In certain embodiments, the obtained siloxane having the general Formula (I) or (I-A) has a number average molecular weight of from 100 to 50,000 g/mol, preferably from 100 to 25,000 g/mol, more preferably 100 to 15,000 g/mol.

R¹ to R⁶, A, Z, X, n1, n2, and p in the Formula (I) and Formula (I-A) are the same as defined for the general Formula (X) and (X-A).

Suitable nucleophiles are amines, phosphines, arsanes, ethers, alcohols, thiols, sulfides, selenium-containing molecules.

Exemplary amines are: primary amines, such as methylamine or ethylamine, secondary amines, such as dimethylamine or diethylamine, tertiary amines, such as trimethylamine or trimethylamine, pyridine, piperidine, pyrrole, pyrroline, pyrrolidine, imidazole, 1-methyl-1H-imidazole, 1-butyl-1H-imidazole, pyrazole, pyrimidine, triazole, triazine, indole, quinoline, purine, such as adenine, guanine, hypoxanthine, xanthine, theobromine, caffeine, uric acid or isoguanine, and porphyrin; preferred for this invention are trimethylamine, triethylamine, pyridine, 1-methyl-1H-imidazole, and 1-butyl-1H-imidazole.

Exemplary phosphines are organophosphines such as methylphosphine, dimethylphosphine, trimethylphosphine, phenylphosphine, diphenylphosphine, triphenylphosphine or cyclic phosphines, such as phosphiranes, phosphirenes, phospholanes, phosphole and phosphinanes.

Exemplary arsanes are monoarsanes, diarsanes or triarsanes with different alkyl chains or heterocycles, such as arsolane and arsole.

Exemplary ethers are ethylene oxide, 1,2-propylene oxide, tetrahydrofuran, furan, tetrahydropyran, pyran, oxirene, oxetane, oxete, oxepane, oxepine, 1,4-dioxane, crown ethers, epichlorhydrine, 1,2-butylenoxide, 1,2-pentylenoxide, isopentylenoxide, 1,2-hexylenoxide, 1,2-heptylenoxide, styrene oxide, cyclohexene oxide, methylglycidyl ether, ethylglycidyl ether, allylglycidyl ether, phenylglycidyl ether, butadiene monoooxide, isopren monooxide, tolylglycidyl ether, cyclohexenoxide, cyclooctanepoxide, cyclododecanepoxide, (+)-cis-limonenoxide, (+)-cis, trans-limonenoxide and (−)-cis, trans-limonenoxide.

Exemplary alcohols are methanol, ethanol, propan-1-ol, butan-1-ol, pentan-1-ol, hexan-1-ol, heptan-1-ol, octan-1-ol, nonan-1-ol, decan-1-ol, undecan-1-ol, dodecan-1-ol, tridecan-1-ol, tetradecan-1-ol, pentadecan-1-ol, hexadecan-1-ol, octadecan-1-ol, hexacosan-1-ol, triacontan-1-ol, propan-2-ol, butan-2-ol, 2-methylpropan-1-ol, 2-methylpropan-2-ol, pentan-2-ol, pentan-3-ol, 2-Methylbutan-1-ol, 3-methylbutan-1-ol, 2-methylbutan-2-ol, 3-methylbutan-2-ol, 2,2-dimethylpropan-1-ol, ethan-1,2-diol, propan-1,2-diol, propan-1,3-diol, butan-1,2-diol, butan-1,3-diol, butan-1,4-diol, butan-2,3-diol, pentan-1,5-diol, hexan-1,6-diol, octan-1,8-diol, nonan-1,9-diol, decan-1,10-diol, propan-1,2,3-triol, cyclopentanol, cyclohexanol, prop-2-en-1-ol, but-2-en-1-ol, (hydroxymethyl)benzol, 1-phenylethan-1-ol, 2-phenylethan-1-ol, diphenylmethanol, triphenylmethanol, phenol, cyclopentanol and cyclohexanol.

Exemplary sulfides are: sulfates and sulfites; thioethers, such as dimethyl sulfide, methyl phenyl sulfide, diethyl sulfide, methyl ethyl sulfide or diphenyl sulfide; thiophenes, such as thiiranes or thiirenes, thietanes or thietes, dithietanes or dithietes, tetrahydrothiophene or thiophene, dithiolane, dithiane and trithiane.

Exemplary selenium containing molecules are: selenols (RSeH), such as selenaphenol; selenyl halides, such as phenylselenyl bromide; selenoethers (R—Se—R), such as dimethylselenide, ethylmethylselenide, diethylselenide, methylpropylselenide, methylbutylselenide, butylethylselenide or ethylpropylselenide; and seleniranes.

The ionization/derivatization reaction can take place in solvent free conditions, as well as in polar and non-polar solvents, such as alcohols, aromatic or aliphatic alkanes, alkenes or alkynes, halogenated aromatic or aliphatic hydrocarbons and hydrocarbons containing heteroatoms, such as O, N, S, P, Cl, Br or F. Preferably, the reaction takes place in solvents such as toluene, THF, heptane, hexane, chloroform, ethyl acetate, acetone or ethanol. Any residual solvent is preferably removed after the completion of the reaction.

The reaction can be carried out at a reaction temperature in the range of from 0 to 250° C., preferably from 50 to 130° C., and/or at a reaction pressure from 0.001 to 50 bar, preferably from 0.5 to 5 bar.

The siloxane having the general Formula (I) or (I-A) can be obtained by conventional methods.

In preferred embodiments, the siloxane having the general Formula (I) or (I-A) used in step (i) is obtainable by reacting a) at least one siloxane having the general Formula (II) or (II-A) comprising at least one hydrogen atom bonded to a silicon atom

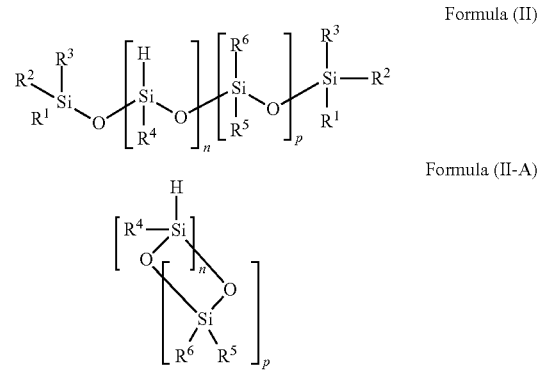

Formula (II)

Formula (II-A)

wherein:
$R^1$, $R^2$, $R^3$, $R^4$, $R^5$ and $R^6$ may be the same or different and each is independently selected from a hydrogen atom or a linear, branched or cyclic hydrocarbon residue having 1 to 20 carbon atoms which may contain at least one heteroatom;

in Formula (II) n is an integer from 1 to 1000 and p is an integer from 0 to 1000; and in Formula (II-A) n is an integer from 1 to 100 and p is an integer from 0 to 100, wherein the sum p+n is equal to or higher than 3;

b) at least one heterocyclic compound; and c) at least one compound having the general Formula (III)

Formula (III)

wherein:

X is selected from halogen atoms, pseudohalogens, $Tf_2N$, $BF_4$ or $PF_6$; and $R^a$ is selected from the group consisting of a hydrogen atom or a linear, branched or cyclic hydrocarbon residue having 1 to 20 carbon atoms which may contain at least one heteroatom, wherein the reaction is catalyzed by at least one platinum catalyst.

The above-described synthesis of the siloxane having the general Formula (I) and (I-A) is disclosed in EP Patent Application no. 18209736.0 in details. The procedure consists in reacting a siloxane containing hydrosiloxane units and a heterocyclic molecule in the presence of a platinum catalyst. The use of a platinum catalyst leads to an easier working-up and a better removing of catalyst from the final product. The reaction catalyzed by platinum follows a zero-order kinetic in substrate, so there is a constant reaction speed during the whole reaction time. Hence, a complete control of the conversion and the desired molecular mass is possible with low polydispersities.

The platinum catalyst can be selected from the group consisting of chloroplatinic acids, preferably hexachloroplatinic acid; alcohol modified chloroplatinic acids; olefin complexes of chloroplatinic acid; complexes of chloroplatinic acid and divinyltetramethyldisiloxane; fine platinum particles adsorbed on carbon carriers; platinum supported on metal oxide carriers, preferably $Pt(Al_2O_3)$; platinum black; platinum acetylacetonate; platinous halides, preferably $PtCl_2$, $PtCl_4$, $Pt(CN)_2$; complexes of platinous halides with unsaturated compounds, preferably ethylene, propylene, and organovinylsiloxanes; styrene hexamethyldiplatinum; platinum divinyltetramethyldisiloxane complex; the reaction product of chloroplatinic acid and an unsaturated aliphatic group-containing organosilicon compound; and a neutralized complex of platinous chloride and divinyltetramethyldisiloxane.

In preferred embodiments, the platinum catalyst is hexachloroplatinic acid, commonly referred to as Speier's catalyst, which is described in U.S. Pat. Nos. 2,823,218 and 3,923,705, or Karstedt's catalyst, which is described in U.S. Pat. Nos. 3,715,334 and 3,814,730. Karstedt's catalyst is a platinum divinyltetramethyldisiloxane complex typically containing about one-weight percent of platinum in a solvent such as toluene.

In preferred embodiments, the platinum catalyst is present in an amount of from 0.0001 mol % to 10 mol %, more preferably 0.001 mol % to 0.1 mol %, of platinum based on the molar quantity of silicon-bonded hydrogen in the siloxane.

In Formula (I), (I-A), (II), or (II-A), the different siloxane subunits n, n1, n2, and p are not necessarily present in the order illustrated herein. The subunits n, n1, n2, and p can be randomly distributed in the siloxane backbone in every possible combination.

In Formula (I), (I-A), (II), or (II-A), $R^1$, $R^2$, $R^3$, $R^4$, $R^5$ and $R^6$ may be the same or different and each is independently selected from a hydrogen atom or a linear, branched or cyclic hydrocarbon residue having 1 to 20 carbon atoms which may contain at least one heteroatom, preferably selected from O, N, S, Si, P, Cl, Br or F.

In preferred embodiments, $R^1$, $R^2$, $R^3$, $R^4$, $R^5$ and $R^6$ are the same or different and each is independently selected from the group consisting of a $C_1$-$C_{12}$ alkyl group, more preferably $C_1$-$C_8$ alkyl group, a $C_2$-$C_8$ alkenyl group, a $C_2$-$C_8$ alkynyl group, a $C_3$-$C_{10}$ cycloalkyl group, a $C_6$-$C_{18}$ aryl group and a $C_6$-$C_{18}$ aralkyl group, which may contain at least one heteroatom, preferably selected from O, N, S, Si, P, Cl, Br or F.

In more preferred embodiments, $R^1$, $R^2$, $R^3$, $R^4$, $R^5$ and $R^6$ are the same or different and each is independently selected from a $C_1$-$C_8$ alkyl group which may contain at least one heteroatom, preferably selected from O, N, S, Si, P, Cl, Br or F, in particular methyl, ethyl, n-propyl, fluoropropyl, n-butyl, sec-butyl, or tert-butyl, or a $C_6$-$C_{18}$ aryl group which may contain at least one heteroatom, preferably selected from O, N, S, Si, P, Cl, Br or F, in particular phenyl, tolyl or benzoyl. In most preferred embodiments, $R^1$, $R^2$, $R^3$, $R^4$, $R^5$ and $R^6$ are the same or different and independently selected from methyl or phenyl.

In Formula (I) or (I-A), A is preferably selected from O, S, $NR^7$ or $PR^7$, where $R^7$ is selected from a hydrogen atom, a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom, preferably selected from O, N, S, P, Cl, Br or F. In more preferred embodiments, A is selected from O or S, in particular O.

In Formula (I) or (I-A), Z is selected from a linear, branched or cyclic hydrocarbon residue having 2 to 60 carbon atoms, preferably 2 to 20 carbon atoms, which may contain at least one heteroatom, preferably selected from O, N, S, P, Si, Cl, Br or F.

In preferred embodiments, Z is selected from the group consisting of a $C_2$-$C_{20}$ alkylene group, a $C_2$-$C_{20}$ alkenylene group, $C_2$-$C_{20}$ alkynylene group, a $C_6$-$C_{18}$ arylene group and a $C_6$-$C_{18}$ aralkylene group, which may contain at least one heteroatom, preferably selected from O, N, S, P, Si, Cl, Br or F.

Exemplary heterocyclic compounds (component b) are: ethylene oxide, 1,2-propylene oxide, tetrahydrofuran, 2-Methyltetrahydrofuran, oxetane, oxetene, tetrahydropyrane, oxepane, 1,4-dioxane, crown ethers, epichlorhydrin, 1,2-butylene oxide, 2,3-butylene oxide, 1,2-pentylene oxide, isopentylene oxide, 1,2-hexylene oxide, 1,2-heptylene oxide, styrene oxide, cyclohexene oxide, methylglycidyl ether, ethylglycidyl ether, allylglycidyl ether, phenylglycidyl ether, butadiene monoxide, isoprene monoxide, tolylglycidyl ether, cyclohexene oxide, cyclooctanee epoxide, cyclododecane epoxide, (+)-cis-limonene oxide, (+)-cis, trans-limonene oxide and (−)-cis, trans-limonene oxide, lactones, such as β-propiolactones, γ-butyrolactones, D-glucono-δ-lactones or ε-caprolactones, dilactones, lactams, lactides and thiolactones, thiolane, other heterocyclic rings such as piperidine, pyrroline or pyrrolidine, aziridine, azirine, oxirene, thiirane (episulfides), thiirene, phosphirane, phosphirene, azetidine, azete, thietane and thiete.

In preferred embodiments, heterocyclic compounds contain 0.

Particularly preferred for this invention are 1,2-propylene oxide, 1,2-butylene oxide, 2,3-butylene oxide, styrene oxide, cyclohexene oxide, tetrahydrofuran, tetrahydropyrane, oxepane, 1,4-dioxane, ε-caprolactones, and crown ethers.

In Formula (III), X is selected from halogen atoms, pseudohalogens, $Tf_2N$, $BF_4$ or $PF_6$ and $R^a$ is selected from a hydrogen atom or a linear, branched or cyclic hydrocarbon residue having 1 to 20 carbon atoms which may contain at least one heteroatom, preferably selected from O, N, S, Si, Cl, Br or F.

In preferred embodiments, X is selected from Br, I or Cl, more preferably Br or I, in particular Br.

In preferred embodiments, $R^a$ is selected from the group consisting of a hydrogen atom, a $C_1$-$C_{12}$ alkyl group, more preferably $C_1$-$C_8$ alkyl group, a $C_2$-$C_8$ alkenyl group, a $C_2$-$C_8$ alkynyl group, a $C_3$-$C_{10}$ cycloalkyl group, a $C_6$-$C_{18}$ aryl group and a $C_6$-$C_{18}$ aralkyl group, which may contain at least one heteroatom, preferably selected from O, N, S, Si, Cl, Br or F.

In more preferred embodiments, $R^a$ is a $C_2$-$C_5$ alkenyl group, more preferably selected from ethenyl, propenyl, butenyl, or pentenyl and structural isomers thereof such as 1- or 2-propenyl, 1-, 2-, or 3-butenyl.

In Formula (II) or (II-A), n is the sum n1+n2 of Formula (I) or (I-A).

In some embodiments, in Formulae (I) and (II), n or the sum n1+n2 is an integer from 1 to 500, more preferably from 1 to 100; and/or p is an integer from 0 to 500, more preferably from 0 to 100. In some embodiments, the siloxane may contain diorganosiloxane units, such as dimethylsiloxane or diphenylsiloxane units, in the backbone. The ratio between n units and p units can be varied.

In some embodiments, in Formulae (I-A) and (II-A), n or the sum n1+n2 is an integer from 1 to 50, more preferably from 1 to 30; and/or p is an integer from 0 to 50, more preferably from 0 to 30, wherein the sum p+n or the sum p+n1+n2 is equal to or higher than 3.

The onium-functionalized siloxane according to the invention or the onium-functionalized siloxane obtained by the method according to the invention can be used as an antimicrobial agent, preferably against molds (like *Aspergillus*), yeasts, fungi (like *Exophiala*, also called "black yeasts"), gram-positive bacteria (like *Staphylococcus*) or gram-negative bacteria.

Various features and embodiments of the disclosure are described in the following examples, which are intended to be representative and not limiting. The following examples serve to explain the invention, but the invention is not limited thereto.

EXAMPLES

Preparation of the Samples

Example 1: Preparation of 3-(4-bromobutoxy)methylsiloxane

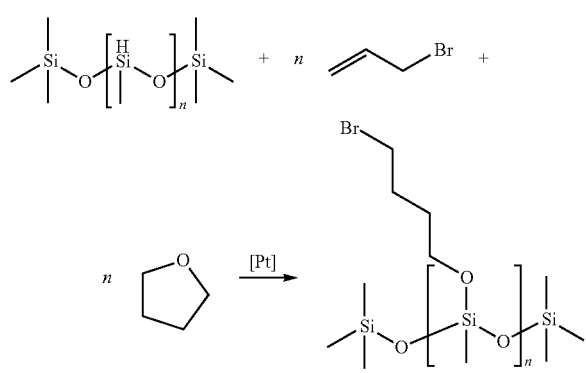

A 250 ml three neck round bottomed flask was degassed under high vacuum ($1^{-3}$ mbar) and flushed with argon. Then, 200 μL of Karstedt (2% of Pt in the catalyst, 0.1% mol in the mixture) and toluene (50 mL, dried over molecular sieves) were added into the flask under argon atmosphere and stirred at room temperature (20° C.) for a couple of minutes. Then tetrahydrofuran (18.5 mL, dried over molecular sieves) and allyl bromide (19.8 mL, 97%) were added into the system. Polyhydridomethylsiloxane (14.9 mL, Mn 1900 g/mol) were added dropwise. The mixture was stirred and refluxed at 100° C. inside under inert atmosphere (Ar) until complete conversion of the SiH groups was achieved (the reaction was followed by $^1$H-NMR). The mixture (when necessary) was decolorized by adding activated carbon and an excess of pentane and stirred for 16 h at room temperature. The crude was filtrated trough celite, and the solvents and volatiles were evaporated under vacuum. The obtained product (yield 80-90%) was a colorless, transparent viscous liquid. The molecular weight and structure of the product was confirmed by GPC (Mn=4882 g/mol, PDI 2.190) and NMR spectroscopy.

Example 2: Preparation of (3-(4(polymethylsiloxane)butoxy) pyridinium bromide

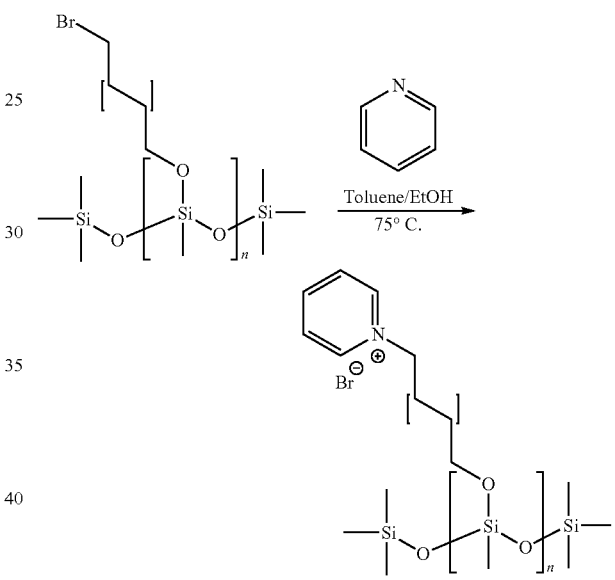

A 25 ml two neck round bottomed flask was degassed under high vacuum ($1^{-3}$ mbar) and flushed with argon. Ethanol (5 mL, dried over molecular sieves) and toluene (5 mL, dried over molecular sieves) are added. Halosilated intermediate obtained according to Example 1 is added into the flask under argon atmosphere and stirred at room temperature (20° C.) for a couple of minutes. Then pyridine (1.85 mL, 99%) was added into the system. The mixture was stirred (oil bath temperature: 75° C.) under inert atmosphere (Ar) until complete quaternization was achieved (the reaction was followed by $^1$H-NMR). The solvents and volatiles were evaporated under vacuum. The obtained product (yield 95-100%) was a slightly yellow to yellow, transparent to milky, high viscous, sticky liquid. The molecular weight and structure of the product was confirmed by NMR spectroscopy.

Example 3: Preparation of (3-(4(polymethylsiloxane)pentoxy) pyridinium bromide

The procedure is the same as shown in Example 2. The halosilated intermediate has a 4-bromopentoxy-side-group.

Example 4: Preparation of (3-(4(polymethylsiloxane)hexyloxy) pyridnium bromide The procedure is the same as shown in Example 2. The halosilated intermediate has a 4-bromohexyloxy-side-group.

Example 5: Preparation of (3-(4(polymethylsiloxane)butoxy) 1-methyl-1H-imidazol-3-ium bromide

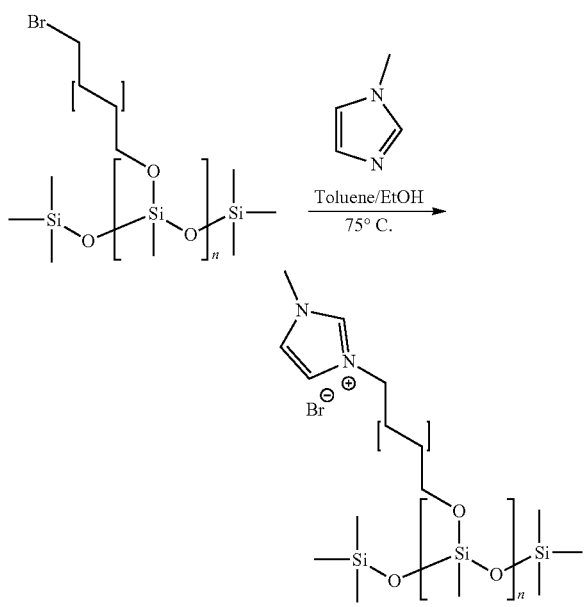

A 25 ml two neck round bottomed flask was degassed under high vacuum ($1^{-3}$ mbar) and flushed with argon. Ethanol (5 mL, dried over molecular sieves) and toluene (5 mL, dried over molecular sieves) are added. Halosilated intermediate obtained according to Example 1 is added into the flask under argon atmosphere and stirred at room temperature (20° C.) for a couple of minutes. Then 1-methyl-1H-imidazole (1.85 mL, 99%) was added into the system. The mixture was stirred (oil bath temperature: 75° C.) under inert atmosphere (Ar) until complete quaternization was achieved (the reaction was followed by $^1$H-NMR). The solvents and volatiles were evaporated under vacuum. The obtained product (yield 95-100%) was a yellow to orange, transparent to milky, high viscous, sticky liquid. The molecular weight and structure of the product was confirmed by NMR spectroscopy.

Example 6: Preparation of (3-(4(polymethylsiloxane)pentoxy) 1-methyl-1H-imidazol-3-ium bromide The procedure is the same as shown in Example 5. The halosilated intermediate has a 4-bromopentoxy-side-group.

Example 7: Preparation of (3-(4(polymethylsiloxane)hexyloxy) 1-methyl-1H-imidazol-3-ium bromide The procedure is the same as shown in Example 5. The halosilated intermediate has a 4-bromohexyloxy-side-group.

Example 8: Preparation of (3-(4(polymethylsiloxane)butoxy) triethylammonium bromide

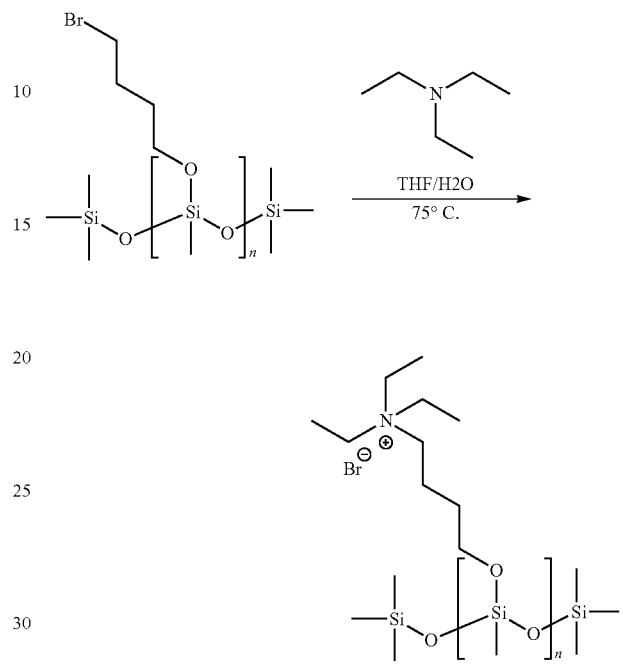

A 25 ml two neck round bottomed flask was degassed under high vacuum ($1^{-3}$ mbar) and flushed with argon. Ethanol (5 mL, dried over molecular sieves) and toluene (5 mL, dried over molecular sieves) are added. Halosilated intermediate obtained according to Example 1 is added into the flask under argon atmosphere and stirred at room temperature (20° C.) for a couple of minutes. Then triethylamine (3.22 mL) was added into the system. The mixture was stirred (oil bath temperature: 75° C.) under inert atmosphere (Ar) until complete quaternization was achieved (the reaction was followed by $^1$H-NMR). The solvents and volatiles were evaporated under vacuum. The obtained product (yield 95-100%) was a white, high viscous, waxy liquid. The molecular weight and structure of the product was confirmed by NMR spectroscopy.

Example 9: Preparation of (3-(4(polymethylsiloxane)butoxy) trimethylammonium bromide

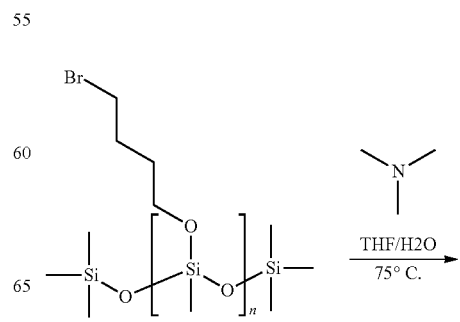

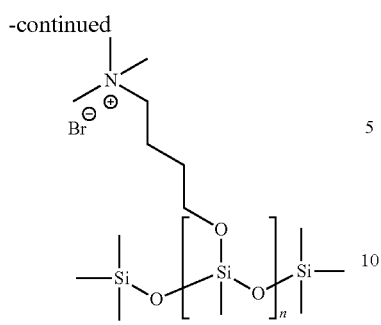

A 25 ml two neck round bottomed flask was degassed under high vacuum ($1^{-3}$ mbar) and flushed with argon. Tetrahydrofuran (5 mL, dried over molecular sieves) is added. Halosilated intermediate obtained according to Example 1 is added into the flask under argon atmosphere and stirred at room temperature (20° C.) for a couple of minutes. Then trimethylamine (5.32 mL, 28% in water, ca. 4.3 mol/L) was added into the system. The mixture was stirred (oil bath temperature: 75° C.) under inert atmosphere (Ar) until complete quaternization was achieved (the reaction was followed by $^1$H-NMR). The solvents and volatiles were evaporated under vacuum. The obtained product (yield 95-100%) was a white, high viscous, waxy liquid. The molecular weight and structure of the product was confirmed by NMR spectroscopy.

Example 10: Preparation of (3-(4(polymethylsiloxane)butoxy) 1-butyl-1H-imidazol-3-ium bromide

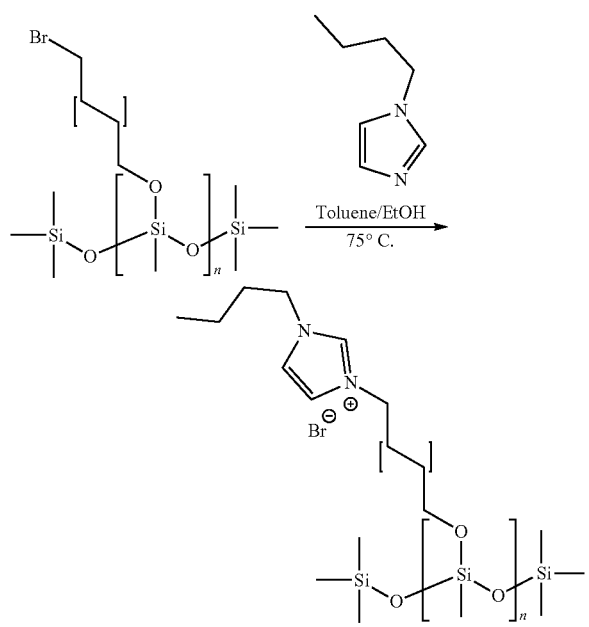

A 25 ml two neck round bottomed flask was degassed under high vacuum ($1^{-3}$ mbar) and flushed with argon. Ethanol (5 mL, dried over molecular sieves) and toluene (5 mL, dried over molecular sieves) are added. Halosilated intermediate obtained according to Example 1 is added into the flask under argon atmosphere and stirred at room temperature (20° C.) for a couple of minutes. Then 1-butyl-1H-imidazole (3.05 mL, 99%) was added into the system. The mixture was stirred (oil bath temperature: 75° C.) under inert atmosphere (Ar) until complete quaternization was achieved (the reaction was followed by $^1$H-NMR). The solvents and volatiles were evaporated under vacuum. The obtained product (yield 95-100%) was a colourless, transparent to milky, viscous, sticky liquid. The molecular weight and structure of the product was confirmed by NMR spectroscopy.

Example 11: Preparation of (3-(4(polymethylsiloxane)pentoxy) 1-butyl-1H-imidazol-3-ium bromide The procedure is the same as shown in Example 10. The halosilated intermediate has a 4-bromopentoxy-side-group.

Example 12: Preparation of (3-(4(polymethylsiloxane)hexyloxy) 1-butyl-1H-imidazol-3-ium bromide The procedure is the same as shown in Example 10. The halosilated intermediate has a 4-bromohexyloxy-side-group.

NMR-Spectroscopy:

All NMR measurements were done on a Bruker 300 MHz, 400 MHz and 600 MHz instrument with deuterated DMSO and methanol as solvent. All the samples were measured at room temperature (297 K). The chemical shifts are given in ppm. The calibration of the chemical shifts in 1H spectra was carried out by using the shifts of the deuterated solvents (DMSO-d6, δH 2.49, 39.7; CD3δD, OH 3.31, 49.0).

GPC:

Gel permeation chromatography was carried out using HP1090 II Chromatography with DAD detector (HEWLETT PACKARD) at 40° C. Tetrahydrofuran (THF) was used as an eluent. THF was passed through three PSS SDV gel columns with molecular weight ranges of 102, 103 and 104 g-mol-1 with a flow rate of 0.9 ml·min-1. The calibration of the device was carried out using polystyrene standards.

Antimicrobial Activity Tests

Kirby-Bauer Test (Zone of Inhibition):

The Kirby-Bauer Test is also known as Agar Diffusion Test and can be used for determination of antimicrobial activity in combination with diffusion properties. The utilized strains are *Aspergillus brasiliensis* (ATCC 16404), *Staphylococcus aureus* (ATCC 6538) and *Exophiala dermatitidis* (isolate). A suspension of the bacterial or fungal strain of interest is spread evenly over the face of a sterile agar plate. The antimicrobial test substrate (preferential liquid aggregation state) is applied to the center of the agar plate onto a small filter paper. The agar plate is incubated for a defined time at a temperature suitable for the test microorganisms. If the test substrate leaches from the filter paper into the agar and it further contains antimicrobial activity, a zone of inhibition is formed around the filter paper. The larger the number in Table 1, the better the antimicrobial effect.

Minimum Inhibitory Concentration (MIC):

The MIC is an antimicrobial testing method to detect the lowest concentration of an antimicrobial agent that prevents visible growth of bacteria or molds. The utilized strains are *Candida albicans* (ATCC 10231) and *Staphylococcus aureus* (ATCC 6538). The evaluation is done optically. The antimicrobial activity is given when the solution is still clear. The concentrations appear from a serial dilution.

TABLE 1

Test Results of Kirby-Bauer Test
Zone of Inhibition [mm] (maximum 45 mm)

| Samples | Aspergillus brasiliensis (ATCC 16404) | Exophiala dermatitidis | Staphylococcus aureus (ATCC 6538) |
|---|---|---|---|
| DMSO | 0.0 | 0.0 | n.d |
| Bardac © | 4.5 | 11.4 | 12.1 |
| Bardac © 1:10 | 2.0 | 5.3 | 8.0 |
| Bardac © 1:100 | 1.5 | 4.3 | 4.5 |
| Pyridine | 0.0 | 1.0 | 1.0 |
| Pyridine 1:10 | 0.0 | 0.0 | 0.0 |
| Pyridine 1:100 | 0.0 | 0.0 | 0.0 |
| 1-methyl-1H-imidazole | 3.5 | 12.3 | 6.5 |
| 1-methyl-1H-imidazole 1:10 | 0.0 | 0.0 | 0.0 |
| 1-methyl-1H-imidazole 1:100 | 0.0 | 0.0 | 0.0 |
| 1-Butyl-1H-imidazole | 5.0 | 15.0 | 11.0 |
| Example 2 | 1.0 | 4.4 | 2.0 |
| Example 3 | 0.0 | 6.0 | 6.0 |
| Example 4 | 0.0 | 7.0 | 6.0 |
| Example 5 | 4.4 | 8.8 | 10.5 |
| Example 6 | 0.0 | 6.0 | 7.0 |
| Example 7 | 0.0 | 9.0 | 7.0 |
| Example 10 | 3.5 | 7.8 | 9.9 |
| Example 11 | 2.8 | 8.3 | 8.3 |
| Example 12 | 1.8 | 8.3 | 8.0 |

DMSO was the utilized solvent in the test, the amines were utilized in the reaction, and Bardac© is a disinfectant. The numbers such as 1:10 or 1:100 show the dilution ratio.

MIC test results are given in ppm in Table 2.

TABLE 2

Test Results of MIC

| | Staphylococcus aureus (ATCC 6538) | Candida albicans (ATCC 10231) |
|---|---|---|
| Example 2 | 25 | 625 |
| Example 5 | 78 | 2500 |
| Example 10 | 39 | 1250 |
| Example 11 | 13 | 625 |
| Example 12 | 13 | 625 |

The invention claimed is:

1. An onium-functionalized siloxane having the general Formula (X)

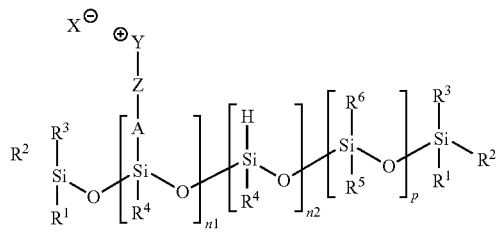

Formula (X)

wherein:

$R^1$, $R^2$, $R^3$, $R^4$, $R^5$ and $R^6$ may be the same or different and each is independently selected from a hydrogen atom or a linear, branched or cyclic hydrocarbon residue having 1 to 20 carbon atoms which may contain at least one heteroatom;

A is a heteroatom;

Z is selected from a linear, branched or cyclic hydrocarbon residue having 2 to 60 carbon atoms which may contain at least one heteroatom;

Y is an onium group;

X is selected from halogen atoms, pseudohalogens, or anions selected from $Tf_2N$, $BF_4$ or $PF_6$;

in Formula (X) n1 is an integer from 1 to 1000, n2 is an integer from 0 to 100, and p is an integer from 0 to 1000, wherein n2 or p is an integer greater than 1.

2. The onium-functionalized siloxane according to claim 1, wherein A is O or S or $NR^7$ or $PR^7$, where $R^7$ is selected from a hydrogen atom, a $C_1$-$C_8$alkyl group, a $C_3$-$C_{10}$ cycloalkyl group, a $C_6$-$C_{18}$ aryl group or a $C_6$-$C_{18}$ aralkyl group, which may contain at least one heteroatom.

3. The onium-functionalized siloxane according to claim 1, wherein the onium-functionalized siloxane is a monomer, oligomer or polymer and has a number average molecular weight (Mn) of from 100 to 50,000 g/mol.

4. The onium-functionalized siloxane according to claim 1, wherein Y is an onium group, which is represented as $ER^cR^d$ where E is a positively charged atom selected from the $16^{th}$ group of the periodic table or $ER^cR^dR^e$ where E is a positively charged atom selected from the $15^{th}$ group of the periodic table, wherein $R^c$, $R^d$ and $R^e$ may be the same or different and each is independently selected from a hydrogen atom, a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom.

5. The onium-functionalized siloxane according to claim 1, wherein X is selected from Br, I or Cl.

6. The onium-functionalized siloxane according to claim 1, wherein A is a heteroatom selected from O or S.

7. A method for preparing the onium-functionalized siloxane having the general Formula (X) or (X-A),

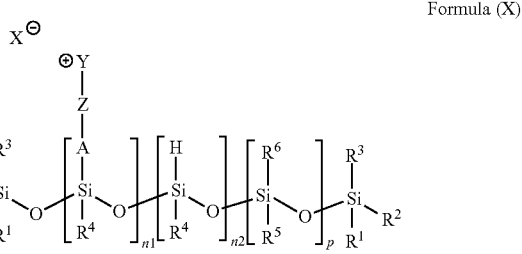

Formula (X)

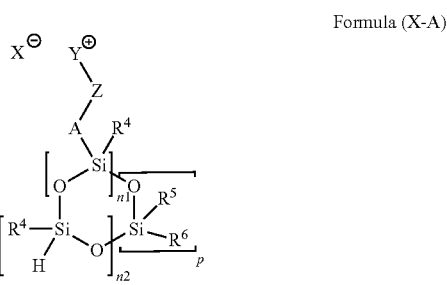

Formula (X-A)

wherein the method comprises:

(i) providing a siloxane having the general Formula (I) or (I-A)

Formula (I)

Formula (I-A)

wherein:

$R^1$, $R^2$, $R^3$, $R^4$, $R^5$ and $R^6$ may be the same or different and each is independently selected from a hydrogen atom or a linear, branched or cyclic hydrocarbon residue having 1 to 20 carbon atoms which may contain at least one heteroatom;

A is a heteroatom;

Z is selected from a linear, branched or cyclic hydrocarbon residue having 2 to 60 carbon atoms which may contain at least one heteroatom;

Y is an onium group;

X is selected from halogen atoms, pseudohalogens, or anions selected from $Tf_2N$, $BF_4$ or $PF_6$;

in Formula (X) and Formula (I), n1 is an integer from 1 to 1000, n2 is an integer from 0 to 100, and p is an integer from 0 to 1000, wherein n2 or p is an integer greater than 1;

in Formula (X-A) and Formula (1-A), n1 is an integer from 1 to 100, n2 is an integer from 0 to 10, and p is an integer from 0 to 100, wherein the sum p+n1+n2 is equal to or higher than 3; and (ii) nucleophilic substitution of X on the siloxane of Formula (1) or (II-A) by a nucleophile containing at least one atom selected from the 15$^{th}$ or 16$^{th}$ group of the periodic table.

8. The method according to claim 7, wherein (a) the nucleophile used in (ii) contains N, P, As, O, S or Se or (b) the nucleophilic substitution is done in the absence of a catalyst or (a) and (b).

9. The method according to claim 7, wherein the siloxane having the general Formula (I) or (I-A) is obtained by reacting a) at least one siloxane having the general Formula (II) or (II-A) comprising at least one hydrogen atom bonded to a silicon atom Formula (II)

Formula (II-A)

wherein:

$R^1$ to $R^6$ are the same as defined for the Formula (X) or (X-A) above;

in Formula (II) n is an integer from 1 to 1000 and p is an integer from 0 to 1000; and in Formula (II-A) n is an integer from 1 to 100 and p is an integer from 0 to 100, wherein the sum p+n is equal to or higher than 3;

b) at least one heterocyclic compound; and c) at least one compound having the general Formula (III)

Formula (III)

wherein:

X is selected from halogen atoms, pseudohalogens, $Tf_2N$, $BF_4$ or $PF_6$; and $R^a$ is selected from the group consisting of a hydrogen atom or a linear, branched or cyclic hydrocarbon residue having 1 to 20 carbon atoms which may contain at least one heteroatom, wherein the reaction is catalyzed by at least one platinum catalyst.

10. The method according to claim 7, wherein the nucleophile is selected from the group consisting of amines, phosphines, arsanes, ethers, alcohols, thiols, sulfides, and selenium-containing molecules.

11. The method according to claim 7, wherein the nucleophile is selected from the group consisting of methylamine, ethylamine, dimethylamine, diethylamine, trimethylamine, triethylamine, pyridine, piperidine, pyrrole, pyrroline, pyrrolidine, imidazole, 1-methyl-1H-imidazole, 1-butyl-1H-imidazole, pyrazole, pyrimidine, triazole, triazine, indole, quinoline, purine, adenine, guanine, hypoxanthine, xanthine, theobromine, caffeine, uric acid, isoguanine, and porphyrin.

12. The method according to claim 11, wherein the nucleophile is selected from the group consisting of trimethylamine, triethylamine, pyridine, 1-methyl-1H-imidazole, and 1-butyl-1H-imidazole.

13. The method according to claim 7, wherein the heterocyclic compound b) is selected from the group consisting of 1,2-propylene oxide, 1,2-butylene oxide, 2,3-butylene oxide, styrene oxide, cyclohexene oxide, tetrahydrofuran, tetrahydropyrane, oxepane, 1,4-dioxane, ε-caprolactones, and crown ethers.

14. An antimicrobial agent comprising the onium-functionalized siloxane according to claim 1.

15. An antimicrobial agent against molds, yeasts, fungi, gram-positive bacteria, or gram-negative bacteria comprising the onium-functionalized siloxane according to claim 1.

16. An onium-functionalized siloxane having the general Formula (X-A)

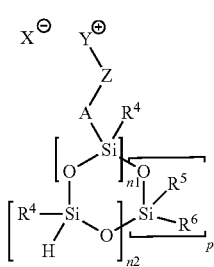

Formula (X-A)

wherein:

$R^4$, $R^5$ and $R^6$ may be the same or different and each is independently selected from a hydrogen atom or a linear, branched or cyclic hydrocarbon residue having 1 to 20 carbon atoms which may contain at least one heteroatom;

A is a heteroatom;

Z is selected from a linear, branched or cyclic hydrocarbon residue having 2 to 60 carbon atoms which may contain at least one heteroatom;

Y is an onium group;

X is selected from halogen atoms, pseudohalogens, or anions selected from $Tf_2N$, $BF_4$ or $PF_6$; and n1 is an integer from 1 to 100, n2 is an integer from 0 to 10, and p is an integer from 0 to 100, wherein the sum p+n1+n2 is equal to or higher than 3.

* * * * *